US008864064B2

(12) United States Patent
DiMarzio et al.

(10) Patent No.: US 8,864,064 B2
(45) Date of Patent: Oct. 21, 2014

(54) WIND POWER GENERATION SYSTEM FOR LIGHTER THAN AIR (LTA) PLATFORMS

(71) Applicant: Northrop Grumman Systems Corporation, Falls Church, VA (US)

(72) Inventors: Donald DiMarzio, Northport, NY (US); Theodore W. Hilgeman, Centerport, NY (US); Alice DiBiasio, Smithtown, NY (US); Thomas J. Hunt, Centereach, NY (US); Douglas R. Frei, Setauket, NY (US); Roy A. Charletta, Smithtown, NY (US); Michael Melnyk, Centerport, NY (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 13/803,438

(22) Filed: Mar. 14, 2013

(65) Prior Publication Data

US 2013/0193266 A1    Aug. 1, 2013

Related U.S. Application Data

(62) Division of application No. 12/702,536, filed on Feb. 9, 2010.

(51) Int. Cl.
*B64B 1/50* (2006.01)
*B64B 1/00* (2006.01)

(52) U.S. Cl.
CPC .... *B64B 1/00* (2013.01); *B64B 1/50* (2013.01)
USPC ................. 244/33; 244/30; 244/26

(58) Field of Classification Search
USPC .............................. 244/33, 30, 24, 31, 25, 26
See application file for complete search history.

(56) References Cited

U.S. PATENT DOCUMENTS

| | | | |
|---|---|---|---|
| 3,912,204 A * | 10/1975 | Wheat et al. ................. 244/154 |
| 4,114,837 A * | 9/1978 | Pavlecka et al. .............. 244/26 |
| 4,129,272 A * | 12/1978 | Jones et al. ............... 244/153 R |
| 4,166,596 A | 9/1979 | Mouton, Jr. et al. |
| 4,269,375 A * | 5/1981 | Hickey ......................... 244/26 |
| 4,350,899 A | 9/1982 | Benoit |
| 4,450,364 A | 5/1984 | Benoit |
| 4,606,515 A * | 8/1986 | Hickey ......................... 244/29 |
| 5,056,447 A | 10/1991 | Labrador |
| 5,890,676 A * | 4/1999 | Coleman et al. ............. 244/128 |
| 6,527,223 B1 * | 3/2003 | Mondale ....................... 244/30 |
| 6,925,949 B1 * | 8/2005 | Phillips ..................... 114/102.1 |
| 7,129,596 B2 | 10/2006 | Macedo |
| 7,249,733 B2 * | 7/2007 | Palmer .......................... 244/30 |
| 7,317,261 B2 | 1/2008 | Rolt |
| 7,464,895 B2 * | 12/2008 | Palmer .......................... 244/30 |
| 7,472,865 B2 | 1/2009 | Sinsabaugh et al. |
| 7,582,981 B1 | 9/2009 | Meller |
| 7,714,457 B2 | 5/2010 | Sankrithi |

(Continued)

*Primary Examiner* — Christopher P Ellis
*Assistant Examiner* — Medhat Badawi
(74) *Attorney, Agent, or Firm* — Robert P. Lenart, Esq.; Pietragallo Gordon Alfano Bosick & Raspanti, LLP

(57) ABSTRACT

An apparatus includes a lighter than air platform, a reversible propulsive/wind turbine, a deployable anchor to constrain movement of the lighter than air platform with respect to an anchor point allowing wind to drive the turbine, and a generator/motor coupled to the turbine to produce electrical power when movement of the lighter than air platform is constrained. A method performed by the apparatus is also provided.

15 Claims, 4 Drawing Sheets

(56) References Cited

U.S. PATENT DOCUMENTS

| | | |
|---|---|---|
| 7,786,610 B2 | 8/2010 | Potter |
| 7,887,007 B2 * | 2/2011 | Mitchell .................. 244/30 |
| 8,157,205 B2 * | 4/2012 | McWhirk .................. 244/30 |
| 8,308,142 B1 * | 11/2012 | Olson ..................... 258/1.4 |
| 2002/0046569 A1 | 4/2002 | Faqih |
| 2002/0171006 A1 * | 11/2002 | Boschma, Jr. .............. 244/31 |
| 2006/0091678 A1 | 5/2006 | Macedo |
| 2007/0176432 A1 * | 8/2007 | Rolt ......................... 290/55 |
| 2008/0006743 A1 * | 1/2008 | Miller et al. ............ 244/53 R |
| 2008/0048453 A1 | 2/2008 | Amick |
| 2008/0116315 A1 | 5/2008 | Hamburg |
| 2008/0290665 A1 * | 11/2008 | Potter ....................... 290/55 |
| 2009/0127861 A1 | 5/2009 | Sankrithi |
| 2011/0006153 A1 * | 1/2011 | Silansky et al. ............ 244/30 |
| 2011/0192938 A1 * | 8/2011 | DiMarzio et al. ........ 244/53 R |

\* cited by examiner

US 8,864,064 B2

WIND POWER GENERATION SYSTEM FOR LIGHTER THAN AIR (LTA) PLATFORMS

CROSS REFERENCE TO A RELATED APPLICATION

This application is a divisional application of U.S. patent application Ser. No. 12/702,536, filed Feb. 9, 2010, which is hereby incorporated by reference.

FIELD OF THE INVENTION

This invention relates to electric power generation for lighter than air (LTA) platforms.

BACKGROUND OF THE INVENTION

Lighter than air (LTA) platforms are enjoying renewed interest in a variety of applications. In addition to traditional uses such as advertising and promotion, there is increased interest in LTA platforms for both civil and military Intelligence, Surveillance, Reconnaissance, and Communications (ISR&C) applications.

The long endurance and low fuel consumption rates inherent in LTA systems are attractive attributes for persistent airborne ISR&C applications. An increasing demand for LTA platforms to provide a significant time-on-station capability, whether they are tethered aerostats or mobile airships, places increasing energy demands on long term power for both its payload and propulsion energy system. Current propulsion and electric power systems that rely on fossil fuels provide both limited transit range and time-on-station. The same is true for batteries as well as conventional fuel cell powered systems. As a result of these limitations, the full endurance potential of LTA ISR&C systems has been difficult to realize. Recent LTA designs have included renewable energy sources such as solar cells (i.e., photovoltaics) to enhance both mobile LTA platform range and time-on-station performance. Photovoltaic solutions can provide additional power to propulsors and payloads, but have their own limitations which include conversion efficiencies, restriction to daylight operations, and weather and weight issues.

There is a need for an energy source for fixed and mobile LTA platforms that can provide significant power for both propulsion (i.e., transit and station keeping) and payload systems.

SUMMARY OF THE INVENTION

In a first aspect, the invention provides an apparatus including a lighter than air platform, a reversible propulsive/wind turbine, a deployable anchor to constrain movement of the lighter than air platform with respect to an anchor point allowing wind to drive the turbine, and a generator/motor coupled to the turbine to produce electrical power when movement of the lighter than air platform is constrained.

In another aspect, the invention provides a method including: providing a lighter than air platform including a propulsion turbine, deploying an anchor to constrain movement of the lighter than air platform with respect to an anchor point, using the propulsion turbine to drive a generator on the lighter than air platform to produce electrical power, hoisting the anchor, storing energy generated by the wind and turbines, and using the propulsion turbine to propel the lighter than air platform.

DETAILED DESCRIPTION OF THE INVENTION

One source of abundant energy that LTA platforms have is the capability of station-keeping with continual access to wind at altitude. In order to exploit this energy resource for LTA platforms, in one aspect, the invention employs an apparatus, referred to herein as an Anchored Power Generation (APG) system. The APG system concept of operation begins with a tethering or anchoring of the LTA platform at an appropriate altitude. For a mobile airship, an anchor line (i.e., a tether) is lowered from the airship with an anchor at the end. Various types of anchors can be used, wherein the selected type would be appropriate for either maritime operations (e.g., a sand or water drag anchor) or land operations (e.g., a grappling anchor, harpoon). For the case of an aerostat, it is assumed that the LTA platform is already tethered.

The APG concept includes an onboard wind turbine electric power generation system. For an aerostat, this wind turbine provides continuous power to onboard payload systems. For a mobile airship, however, this energy can be converted and stored to provide additional power for in-transit propulsion as well as payload support. During transit, the onboard wind turbine acts in reverse, serving as a propulsion system and consuming the energy that was stored while the airship was anchored.

In one embodiment, for a mobile airship mode of operation, electric energy generated by the wind turbine can be used to split water (e.g., captured atmospheric humidity or onboard storage) in order to generate hydrogen. Hydrogen can be stored as part of the airship buoyancy system, and used to generate electricity via fuel cells to power a dual mode generator-motor propulsion system. An active hydrogen generation system compensates for buoyancy gas leakage and significantly extends LTA range and lifting capability.

As an alternative to fuel cell energy conversion, some of the stored hydrogen can be directly consumed by an internal combustion engine propulsion system that utilizes hydrogen as the propulsive energy source. The APG system allows a mobile LTA airship to periodically rest, regenerate hydrogen, and store the hydrogen for energy needed for in-transit propulsion and payload requirements (e.g., communications, radar, etc.). When the airship is on-station it can simply lower its anchor and run all payload electrical systems directly off of the wind turbine generator.

An airship with the APG system has potentially unlimited range and access to operationally significant power for on-station payload support without any ground based refueling or servicing. This is especially important when persistent unmanned operations are required for civilian and military ISR&C missions.

Figure 1:
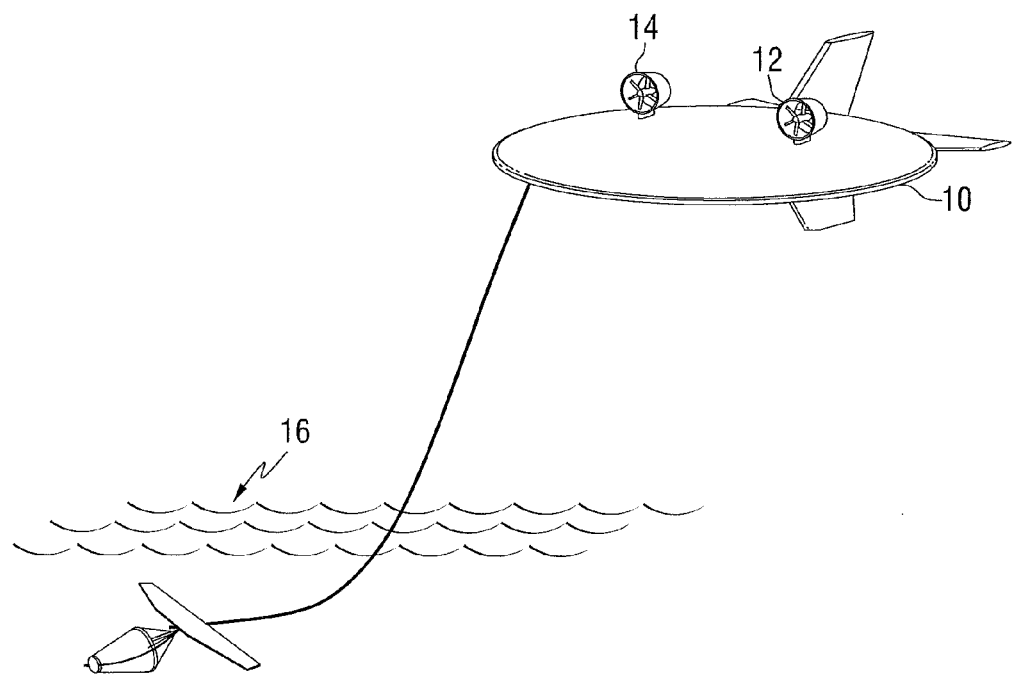
FIG. 1 is a schematic representation of an LTA platform with an anchor power generation (APG) system.

Referring to the drawings, FIG. 1 is a schematic representation of an LTA platform 10 with an Anchor Power Generation (APG) system. The LTA platform includes at least one turbine 12 and 14. An anchor 16 system is used to constrain the movement of the LTA platform with respect to an anchor point. This limits the movement of the LTA platform with respect to winds experienced by the platform at altitude. The wind can then be used to drive the turbine and the turbine can be used to drive a generator to produce electricity that can be used to power a payload and/or can be used to store energy that can be subsequently used to drive the turbine in a propulsive mode. The anchor can be deployed when on-board power generation is desired.

Figure 2:
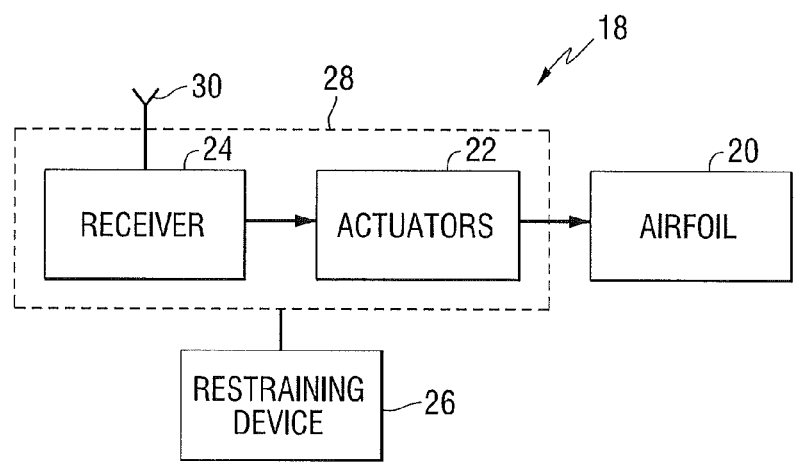
FIG. 2 is a block diagram of portions of a flying anchor system.

The anchor can be a remote controlled, flyable anchor, that includes an airfoil and an actuator needed to control the orientation of the airfoil to direct the flight of the anchor. FIG. 2 is a block diagram of portions of a flying anchor system 18. The flying anchor system includes an airfoil 20, an actuator 22, a receiver 24, and a restraining device 26. The actuator and receiver are components of a control system that may be contained in a housing 28. The housing would be connected to the lighter than air platform by a tether (not shown). When the flying anchor is to be deployed, it can be lowered from the LTA platform on the tether. Its location can be controlled by sending control signals to the receiver through the on-board control system in the LTA platform. These control signals are then used to activate the actuators, which control the orientation of the airfoil to control the flight of the anchor system. The control signals can be supplied either wirelessly, and received by the antenna 30, or through a wire in the tether. Once the anchor has been positioned at a desired location, the restraining device 26 can be deployed. As used in this description, a restraining device is a device that prevents or resists movement of the anchor system with respect to land, water or air, depending upon the type of anchor system. In various embodiments, restraining devices can include, for example, anchor rods, harpoons, grappling hooks, drogues, Danforth anchors, or parachutes.

Figure 3:
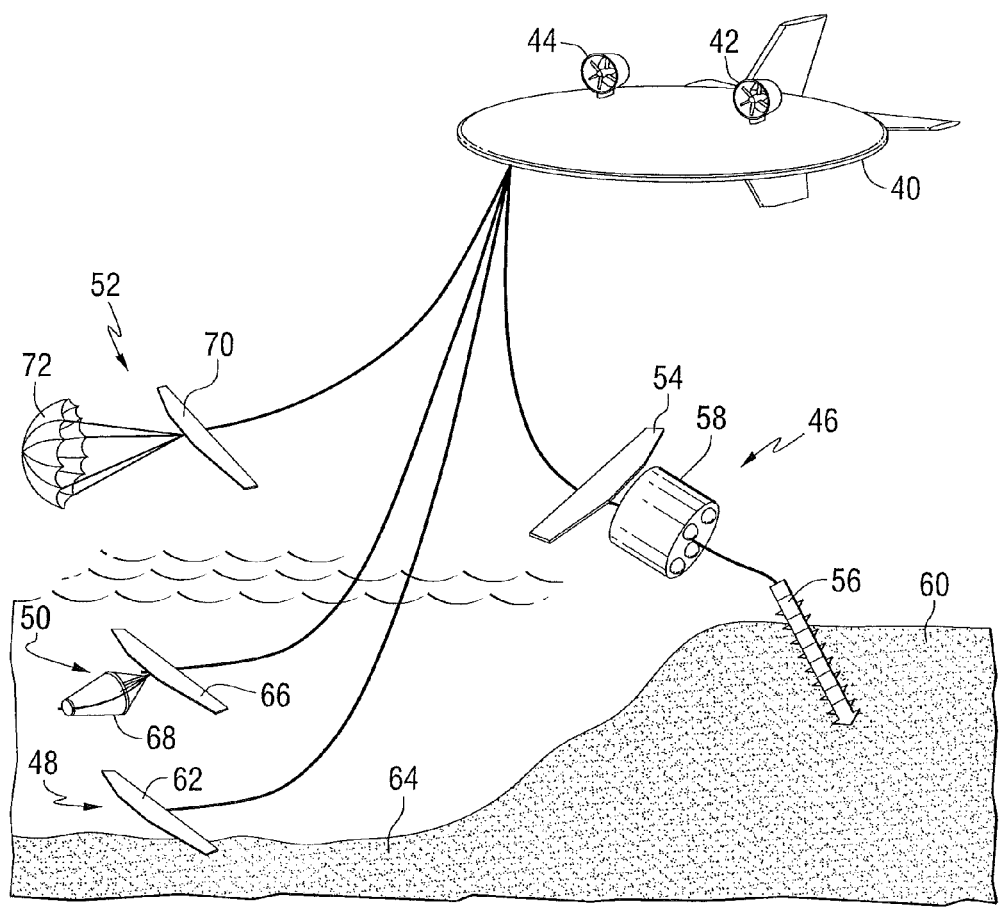
FIG. 3 is a schematic representation of an LTA platform with several optional anchor systems.

FIG. 3 is a schematic representation of an LTA platform 40 with an Anchor Power Generation (APG) system. The illustrated LTA platform includes at least one turbine 42 and 44, and a plurality of alternative anchor systems 46, 48, 50 or 52 to constrain the movement of the LTA platform with respect to an anchor point. The anchor is adapted to be deployed and retrieved when the LTA platform is at altitude. FIG. 3 shows several alternative "flying anchor" systems that include a restraining device and an airfoil, and are remotely piloted to guide the restraining device to an appropriate location. The flying anchor system may include a radio-controlled aerodynamic steering unit similar to an aerial-refueling "flying boom", which effectively damps out oscillations and crosswind effects. An aerodynamic deployable anchor system enables remote autonomous mooring and wind power generation and station keeping.

For land operations, in the example of FIG. 3, anchor system 46 includes an airfoil 54 and an anchor rod or harpoon 56. The harpoon can be housed within a housing 58 that is flown to a position over land, using the airfoil and actuators that can be remotely controlled as shown in FIG. 2. Once the desired position is reached, the harpoon can be ejected from the housing and embedded in the land 60 to provide an anchor point. In an alternative embodiment, the housing may contain a grappling hook that can be ejected from the housing and used to take advantage of rough terrain or fixed objects and materials on the ground by engaging such land based features.

For maritime operations, the anchor will be lowered and "flown" to a position below the sea surface. Where the depth permits, a retraining device can be embedded in the seabed. For deeper water, water drag anchoring can be employed. Anchor system 48 includes a restraining device 62, which may be a Danforth anchor that can be embedded in a seabed 64 to provide an anchor point. Anchor system 50 includes an airfoil 66 and actuators needed to position the airfoil to direct the flight of the anchor. Anchor system 50 further includes a restraining device such as a sea anchor or drogue 68. In this case the restraining device does not provide a fixed anchor point, but rather provides a moveable anchor point which nonetheless still serves to restrain the LTA platform that is coupled to the anchor system by the tether. It is anticipated that a water drag (e.g., drogue) anchor system for maritime environments will be sufficient for many LTA designs and modes of operation.

In addition to the basic maritime and land anchoring concepts described above, another method of "fixing" the position of the LTA platform relative to the prevailing winds for efficient wind turbine operation involves the deployment of large parachutes or "air drogues" that take advantage of variation in wind speed with different altitudes. By taking advantage of the differential in wind speeds, the LTA platform may be slowed down enough to enable useful power generation for LTA system and payload support. This air-drogue concept potentially reduces tether length requirements and may allow for power generation and energy storage while the LTA platform is in-transit at reduced speeds.

Anchor 52 is an air anchor that includes an airfoil 70 and actuators needed to position the airfoil to direct the flight of the anchor. Once the air anchor is positioned at a desired altitude, a restraining device in the form of a parachute 72 can be deployed. In this case, the restraining device does not provide a fixed anchor point, but rather provides a moveable anchor point that nonetheless still serves to restrain the LTA platform that is coupled to the anchor system by the tether.

In each embodiment, the APG system includes a deployable anchor line system of sufficient length and strength that takes advantage of significant wind speeds found at higher altitudes, and has a reusable restraining device appropriate for either maritime, land based, or completely airborne operations. The anchor system can utilize tether technology already used for aerostats with existing anchoring systems adapted for remote operation in ocean or land environments. Lightweight tether strap systems are available that have both the length and strength to hold a sizable LTA platform at high attitude. For example, holding an LTA platform at 5000 ft. altitude with a tether line at a 45 degree line layout would require 300 lb. total of an 8000 lb. rated line. For a 20,000 ft. altitude the line weight is 1200 lbs. LTA platform tether line capacity will depend on turbine requirements for maximum wind speeds, which varies as a function of geographic region and altitude.

Another benefit to having a reusable anchoring system is remote station keeping. This can help the LTA platform maintain a steady position and orientation for operation of payload systems such as radar, electro/optical/infrared (EO/IR) sensors, and communications links. The reusable anchoring system provides a versatile re-deployable LTA platform capability not found in current tethered (fixed) systems, which require ground support components. Embodiments of the invention allow for unmanned operation in remote unprepared areas around the world.

The airborne wind turbine generator can also be integrated into a propulsion system. Wind turbines are traditionally employed as ground based (or offshore) stationary systems for renewable power generation. Large blades that turn at moderate revolutions per minute (rpms) are employed in order to maximize power generation for the relatively slow wind speeds found near ground level. Even with low wind speeds (~10 knots); megawatt power levels can be obtained by individual wind turbine towers. Wind turbine power goes as the cube of wind velocity, so if a wind turbine can be operated at altitudes reached by conventional aerostats and airships, the turbine blade diameter can be greatly reduced and significant power can still be generated.

Figure 4:
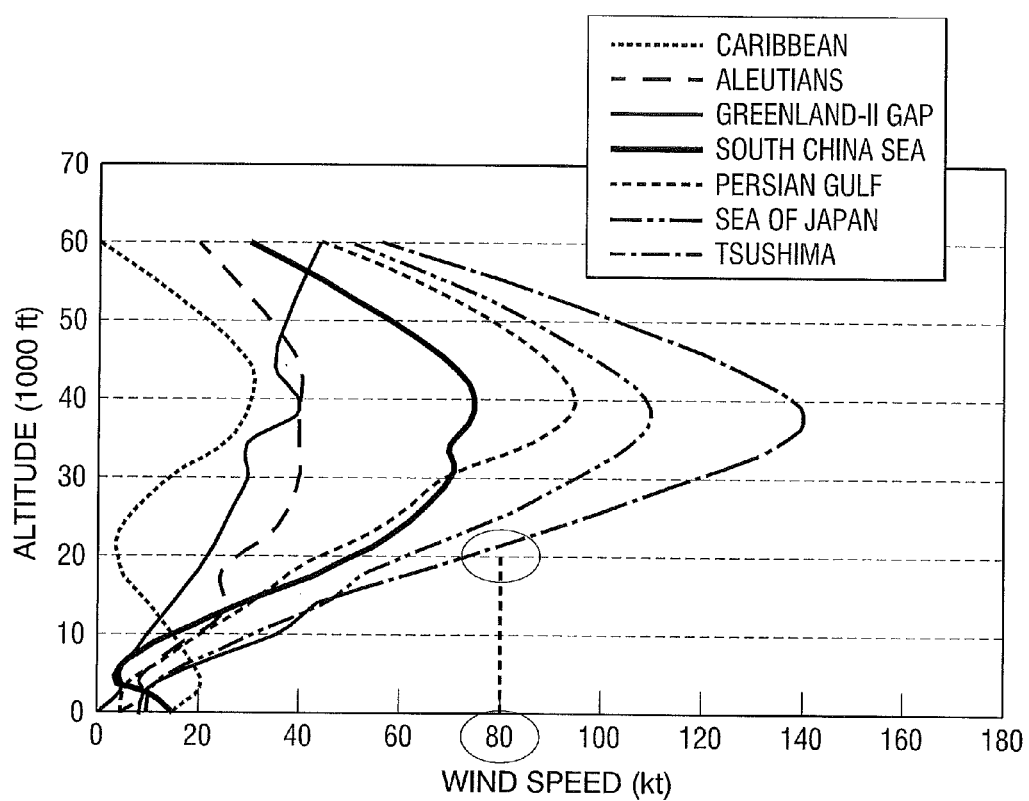
FIG. 4 is a graph of atmospheric wind speeds as a function of altitude.

FIG. 4 shows average wind velocity around the globe as a function of altitude. Wind speeds rise dramatically up to an altitude of 40,000 ft, after which they drop before reaching the upper stratosphere. For example, an LTA platform operating at 20,000 ft can see maximum wind speed in excess of 80 kts for various geographic regions.

Unlike current concepts for airborne wind turbines for power grid support that are limited by the heavy copper cables needed to get power from the ground up to the platform, the APG system eliminates the need for the copper cable as power is kept onboard the LTA platform for payload consumption and propulsion. This permits the use of much longer lightweight cable materials to access higher wind speed at higher altitudes.

Figure 5:
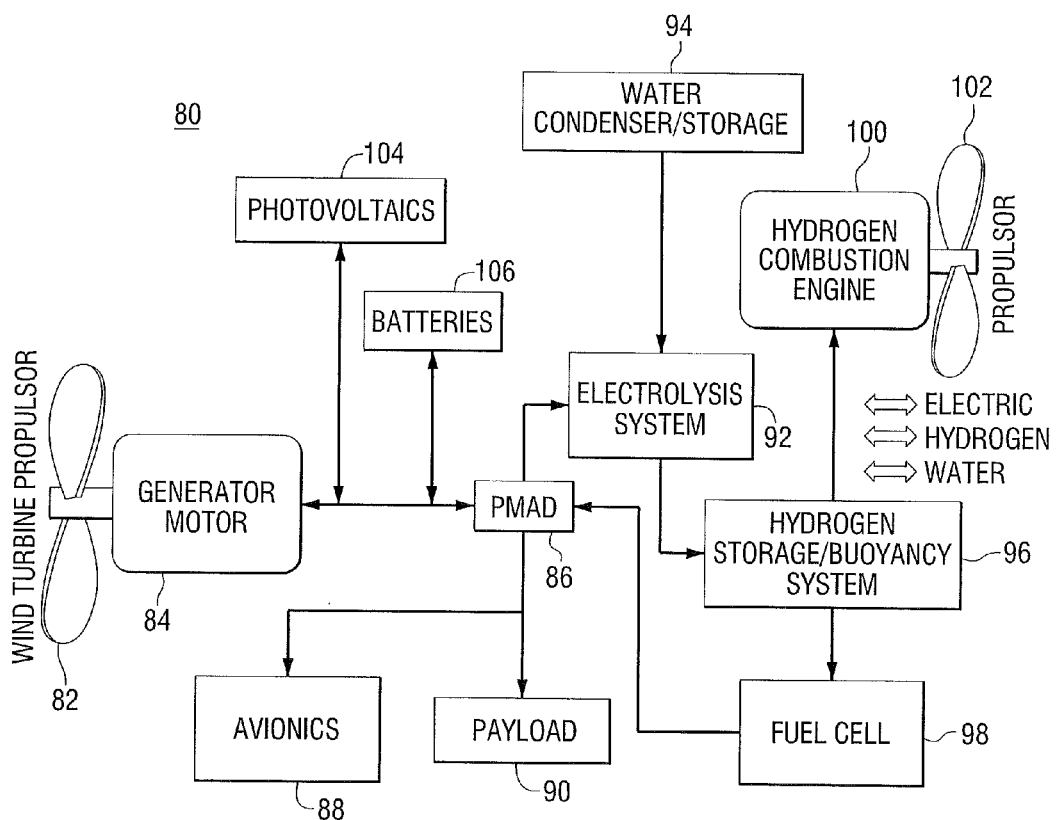
FIG. 5 is a block diagram of an LTA wind turbine generator/motor system.

A schematic of an APG wind turbine generation/propulsion system 80 is shown in FIG. 5. The generation/propulsion system 80 includes a wind turbine propulsor 82 coupled to a generator motor 84. The generator motor is electrically connected to a power management and distribution (PMAD) component 86. The PMAD component distributes electricity to on-board avionics 88, a payload 90, and an electrolysis system 92. The electrolysis system uses the electricity to split water from a water condenser/storage unit 94 into hydrogen and oxygen. The hydrogen is delivered to a hydrogen storage/buoyancy system 96. The hydrogen can then be used to power a fuel cell 98 that produces electricity that is returned to the PMAD for further distribution. The hydrogen can also be used in a hydrogen combustion engine 100 to drive a propulsor 102. Photovoltaic cells 104 can be provided to produce additional electricity that can be used to drive the generator motor or can be distributed by the PMAD. Batteries 106 can be provided to store electricity produced by the generator motor or fuel cell and to supply electricity to drive the generator motor or for further distribution by the PMAD. Batteries can also be used to store electricity produced by the additional photovoltaic cells during daytime operations. While FIG. 5 shows a separate propulsor 102, in some embodiments, the motor generator can be used to drive the wind turbine 82 to propel the LTA platform, thereby eliminating the need for a separate propulsor.

Significant wind energy can be harvested at altitudes accessible by LTA platforms. When the LTA is anchored, power from the wind turbine is routed to the power management and distribution system (PMAD). The PMAD regulates power distribution to a variety of payload applications and energy conversion and storage systems. When the LTA is in a transit mode, the APG system may require a series of rest and regeneration periods depending on the range, altitude and payload weight mission requirements. During the regeneration period, most of the wind turbine power is routed to an energy storage system. This could be comprised of a system of batteries as well as to a water-to-hydrogen conversion system. Hydrogen can be stored in tanks and/or serve as part of the LTA buoyancy system. When enough hydrogen has been generated during the rest period, the LTA platform hoists its anchor and the hydrogen energy is then converted by the on-board fuel cells to electricity which subsequently powers the wind turbine generator as an electric motor, thus providing a propulsive force. Alternatively, the stored hydrogen can be routed directly to a hydrogen burning internal combustion engine propulsion system. When "on-station", all payload and avionics systems will run directly off of the wind turbine, thus conserving any onboard energy supplies (i.e., batteries, hydrogen, fossil fuel).

To quantitatively demonstrate the practicality for the power generating potential of the APG system, the power output can be calculated for a given set of LTA flight parameters including altitude, wind speed, wind turbine blade diameter, and efficiency. The power generated by a wind turbine is given by Equation (1):

$$P = \tfrac{1}{2} A \rho V^3 E \quad (1)$$

where P is the power in Watts, A is the area defined the blade rotation, $\rho$ is the air density at altitude, V is the mean wind velocity at altitude, and E is the turbine aerodynamic efficiency.

As an example, consider an anchored altitude of 20,000 ft. with an air density of approximately 0.525 kg/m$^3$. From FIG. 4, it can be seen that from regions ranging from the South China Sea to the Persian Gulf, and out to the Sea of Japan and the Tsushima Strait, the mean wind velocities varies from 50 kt to 75 kt. In the calculation, to follow the use of mean wind velocities results in an underestimate by a factor of approximately 2 of the average power output due to the atmospheric Weibull (asymmetric) distribution of wind velocities impacting the velocity cube dependence of the power. Also assume a turbine blade diameter of 8 meters (an approximate sizing for a single generator/propulsor system relative to the LTA platform volume), and a conservative (poor) turbine efficiency of E of 0.15. The resulting power output from one turbine generator in this case ranges from 38 KW to 128 KW. Doubling this due to the Weibull wind speed distribution results in a final APG system power range at 25,000 ft. that ranges from 76 KW to 472 KW for a single wind turbine system. A dual wind turbine and propulsion system can be used for the LTA platform, which will effectively double this power generation capability.

Depending on regional wind speeds at altitude, the APG system has a significant power generation capability. The available power for anchored on-station operations is sufficient to power a variety of demanding payload packages including communications, EO/IR sensors and radar. This is especially true if two turbines are used to double the power. Power output can be optimized via moderate altitude adjustment depending on regional winds due to the sensitive cubic power dependence on velocity.

In addition to on-station payload support, the APG system can provide power capacity for significant energy harvesting and storage for LTA propulsion. For the hydrogen generation and storage concept, assuming sufficient onboard water collection and/or storage capacity and standard electrolysis techniques with mean winds of 80 kts at altitude, approximately 156 lb/hr (average rate per speed distribution) of hydrogen can be generated based on the use of two wind turbine propulsor systems. This is a significant energy harvesting capability that also provides buoyancy gas as needed (i.e., for leakage mitigation).

In various embodiments, the invention provides an Anchor Power Generation (APG) system for LTA aerostats and airships for propulsion power and/or payload power. The mobile airship employs wind energy harvesting to periodically regenerate its energy supply to enable long endurance flight without the need for ground refueling. The tether is not used to transport energy to the ground and can be a simple lightweight cable that is non-conductive and has a low weight-to-strength ratio. The tether can be deployed periodically to a fixed or movable anchor point to restrain movement of the airship position so that it can take advantage of the high speed winds at high altitudes to regenerate its energy supply. Thus the airship can stay aloft indefinitely which makes it ideal for ISR&C applications in addition to long range cargo transport.

If the anchor system described above is replaced by a fixed tether, the invention can be implemented as an apparatus including a lighter than air platform, a wind turbine, a tether to constrain movement of the lighter than air platform with respect to an anchor point allowing wind to drive the turbine, a generator/motor coupled to the turbine to produce electricity when the turbine is driven by the wind, an energy storage system on the lighter than air platform for converting the electricity into stored energy, and a power management system for using the stored energy to drive the generator/motor.

The systems described above provide several advantages including: continuous wind energy harvesting; continuous power for on-station payload support; in-transit energy harvesting and storage for propulsion; long duration unmanned on-station and transit capability; multiple civil and military applications; and low cost long endurance airborne platform power system. High wind speed at altitude results in significant power for small turbines.

While the invention has been described in terms of several embodiments, it will be apparent to those skilled in the art that various changes can be made to the described embodiments without departing from the scope of the invention as set forth in the following claims.

What is claimed is:

1. An apparatus comprising:
   a lighter than air platform;
   a turbine;
   a deployable flyable anchor including a restraining device to constrain movement of the lighter than air platform with respect to an anchor point allowing wind to drive the turbine; and
   a generator/motor coupled to the turbine to produce electrical power when movement of the lighter than air platform is constrained and to propel the lighter than air platform when the lighter than air platform is not constrained.

2. The apparatus of claim 1, further comprising:
   an energy storage system for storing energy supplied by the generator/motor.

3. The apparatus of claim 2, wherein the energy storage system supplies energy to the generator/motor to drive the turbine and propel the lighter than air platform.

4. The apparatus of claim 2, wherein the energy storage system comprises:
   a water source;
   an electrolysis cell for using the electrical power to split water into hydrogen and oxygen; and
   a hydrogen storage system.

5. The apparatus of claim 4, further comprising:
   a second turbine; and
   a hydrogen engine for using the hydrogen to drive the second turbine.

6. The apparatus of claim 1, wherein the restraining device comprises one of:
   a harpoon, a grappling hook, a sail, a drogue, and an anchor.

7. A method comprising:
   providing a lighter than air platform including a propulsion turbine;
   deploying a flyable anchor including a restraining device to constrain movement of the lighter than air platform with respect to a ground anchor point;
   using the propulsion turbine to drive a generator on the lighter than air platform to produce electrical power when movement of the lighter than air platform is constrained;
   hoisting the anchor; and
   using the propulsion turbine to propel the lighter than air platform when movement of the lighter than air platform is not constrained.

8. The method of claim 7, further comprising:
   using the electrical power to store energy.

9. The method of claim 8, wherein the step of using the electrical power to store energy comprises:
   splitting water to generate hydrogen; and
   storing the hydrogen.

10. The method of claim 9, further comprising:
    using the hydrogen in a buoyancy system.

11. The method of claim 9, further comprising:
    using the hydrogen to generate electricity.

12. The method of claim 9, further comprising:
    using the hydrogen in an internal combustion engine in a propulsion system.

13. The method of claim 8, wherein the step of using the electrical power to store energy comprises:
    charging a battery.

14. An apparatus comprising:
    a lighter than air platform;
    a turbine;
    a deployable flyable anchor including a restraining device to constrain movement of the lighter than air platform with respect to a ground anchor point allowing wind to drive the turbine; and
    a generator/motor coupled to the turbine to produce electrical power when movement of the lighter than air platform is constrained and to propel the lighter than air platform when the lighter than air platform is not constrained, wherein the flyable anchor includes an airfoil; an actuator for controlling the orientation of the airfoil; and a control system for controlling the actuator in response to remote control commands.

15. The apparatus of claim 14, wherein the restraining device comprises one of:
    a harpoon, a grappling hook, and an anchor.

* * * * *